June 12, 1951     A. M. CARTER     2,556,613
SAFETY CYLINDER FOR HYDRAULIC BRAKES
Filed Nov. 17, 1947
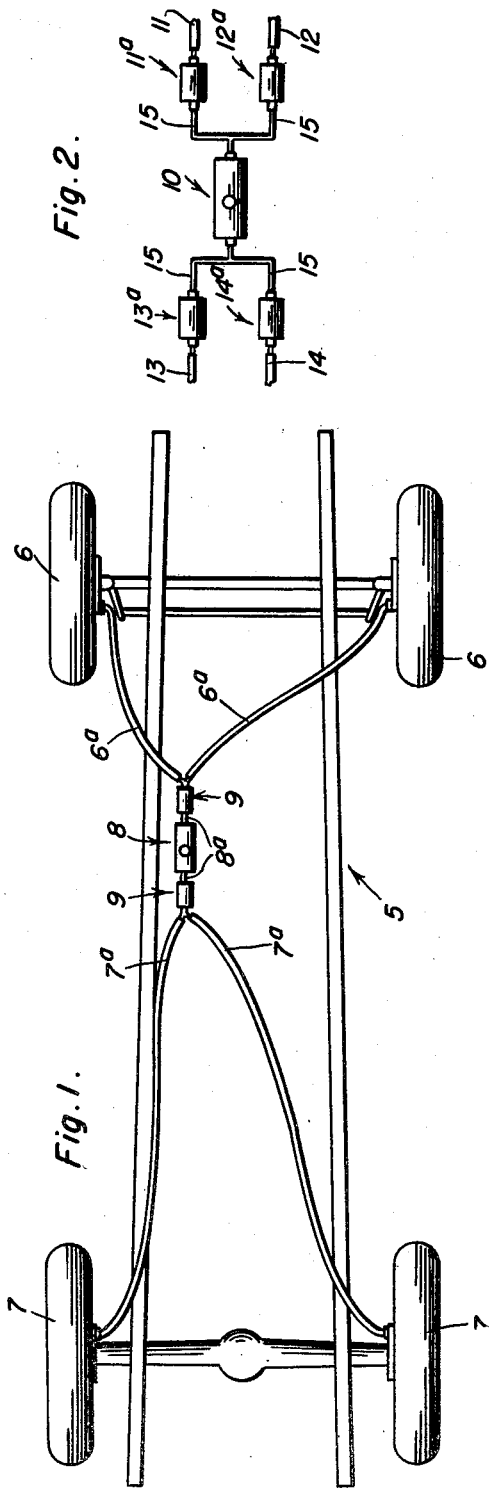
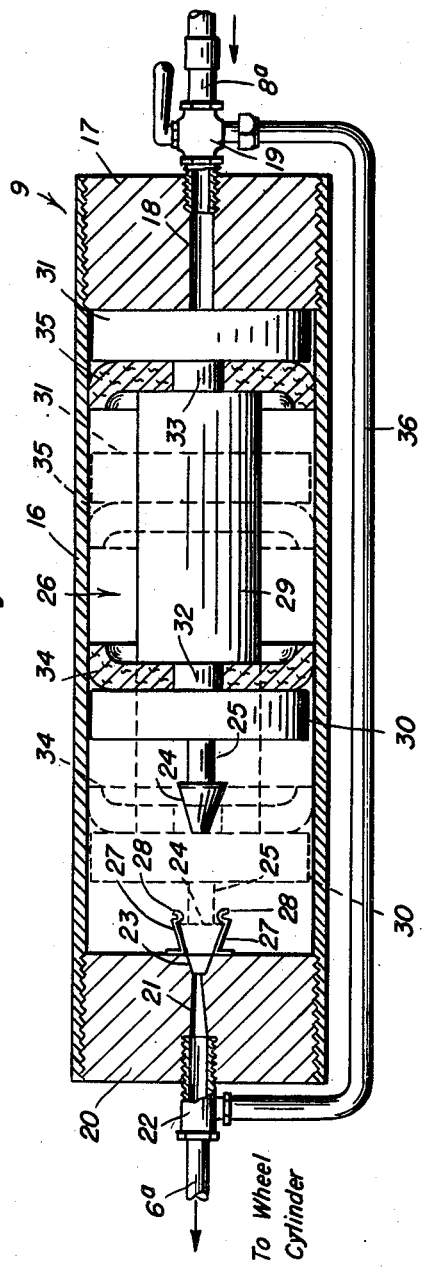
Alfred M. Carter
INVENTOR.

Patented June 12, 1951

2,556,613

UNITED STATES PATENT OFFICE 2,556,613

SAFETY CYLINDER FOR HYDRAULIC BRAKES

Alfred M. Carter, Fort Valley, Ga., assignor of forty-nine per cent to Lou Carter Roberts, Fort Valley, Ga.

Application November 17, 1947, Serial No. 786,372

2 Claims. (Cl. 303—84)

The present invention relates to certain new and useful improvements in safety devices which are expressly adapted for use in and as contributory parts of a hydraulic or fluid brake system, such as is utilized on motor vehicles, particularly so-called automobiles, trucks and other conveyances. Needless to say, I am aware that ways and means are offered by others in this line of endeavor, with a view toward correcting defects in fluid brake systems. Therefore, I do not claim to be a pioneer in the provision of such added facilities for wheel cylinder lines. I am concerned, primarily, with the adoption and use of what I identify as automatically operable safety cylinders, whose use in present-day fluid brake systems increases the efficiency of operation of the latter and, under ordinary or normal conditions, makes it possible to have, under average conditions, at least three brakes available for use until requisite repairs are aptly made in a leaky or damaged wheel cylinder line.

It is an object of the invention, therefore, to provide, between the customary master cylinder and the four wheeled cylinders, the aforementioned so-called safety cylinders whereby, in the event that a brake or leakage occurs in any one of the four lines between the master cylinder and a wheel cylinder, the escaping fluid in the defective line will be trapped and cut off between the safety cylinder and master cylinder, whereby to prevent further leakage at this point, and to reserve sufficient fluid in the remaining three lines to provide brakes sufficient for ordinary stoppage purposes.

More specifically, I have evolved and produced a simple and practical safety device, which is characterized by a cylinder having a novel piston slidably mounted therein, having a valve seat at the discharge end of the cylinder and a cutoff valve on the piston which, under abnormal conditions is automatically engageable with said seat.

A further object of the invention is to provide a safety cylinder of the type specified, which, in addition, has a bypass line with a suitable threeway hand valve for throwing said line "in" and "out" of use, when necessary, which bypass comes in handy to bleed the oil from the line containing the safety cylinder, and without interference from said cylinder.

Other objects and advantages will become more readily apparent from the following description and the accompanying illustrative drawings.

In the drawings, wherein like numerals are employed to designate like parts throughout the views:

Figure 1 is a top plan view showing a wheel-supported automobile or equivalent chassis, illustrating the master cylinder, the four lines to the wheel cylinders (latter not shown) and showing two of the safety cylinders between the master cylinder and said wheel cylinder lines.

Figure 2 is a fragmentary plan view, more-or-less of a diagrammatic character, showing the same principle illustrated in Figure 1, but covering the use of an individual safety cylinder for each wheel cylinder line.

Figure 3 is a view in section and elevation, of one of the so-called safety cylinders.

It will be seen from the foregoing that, under the principles of this invention, it is within the sphere of the inventive concept to employ two or more of the automatic safety devices. For example, in Figure 1 we see the chassis 5 provided with front wheels 6 and rear wheels 7, there being individual fluid delivery lines 6a and 7a connected respectively with said front and rear wheels in the customary paired fashion. In this arrangement, the master cylinder, shown somewhat diagrammatically, is denoted by the numeral 8. Also, the automatic safety devices, the so-called safety cylinders, of which there are two, are here denoted by the numerals 9. All of the safety cylinders are the same in construction and they may be used in a pair as shown in Figure 1, where they exist between the master cylinder and lines 6a and 7a; or, they may be employed in a quartet arrangement, as shown in Figure 2. In the latter figure, the master cylinder is denoted by the numeral 10, the front wheel fluid delivery lines are designated by the numerals 11 and 12, the rear wheel fluid lines are denoted by the numerals 13 and 14, and all four lines have their individual safety cylinders, the latter being denoted by the numerals 11a, 12a, 13a, and 14a respectively. Suitable connections, through branch pipes, are made between the master cylinder and safety cylinders, said pipes being denoted by the numerals 15. It will be clear that it is not necessarily the system which I am interested in, but primarily, the construction of the unit or safety device itself and this is shown in Figure 3. Reference being had to the latter figure, it will be seen that said device comprises an open-ended cylinder 16 which is screw-threaded at its right-hand end to accommodate a closing plug 17, said plug having a bore 18 which delivers the fluid under pressure into the cylinder from the master cylinder. The line from the master cylinder is denoted at 8a (based on the showing in Figure 1) and a three-way valve is provided at 19 for hand-control use. Said valve may be actuated by hand to close the line 8a entirely and also used as hereinafter described. The opposite end of the cylinder is also internally screw-threaded and this, too, has a special closing plug 20 threaded into it. Furthermore, the plug 20 has a bore 21 therethrough which registers, by way of a coupling 22, with the pipe line 6a which delivers fluid under pressure to one of the wheel cylinders (not shown). The inner end of the bore is tapered to provide a valve seat 23 for a frusto-conical valve 24 carried by a stem 25 forming an integral part of a fluid slid piston 26. The plug 20 is also provided adjacent the valve seat with spring clips 27 provided with detents or hooks 28, which automatically engage over the shoulder portion of the valve, when said valve 24 is closed, to keep it closed as shown in dotted lines at the left in Figure 3. Referring to the piston, it will be seen that this is in the form of a cylindrical reduced body 29, having enlarged disk-like heads 30 and 31 at opposite ends, said heads being connected to the body by reduced necks 32 and 33 and said necks serving to accommodate the cup washers 34 and 35. These washers are like those employed in wheel cylinders and in master cylinder constructions and have tight sliding contact with the bore or passage of the cylinder 16. The heads 30 and 31 serve to brace and back up the cups and to cause same to operate effectively. The heads are of a diameter less than the internal diameter of the bore or passage of the cylinder itself, to permit free passage of fluid. Fluid is trapped in the right-hand chamber, that is, between the cup 35 and the plug 17, this on the one hand. In addition, fluid is also trapped in the opposite chamber, that is, the chamber which exists between the head 30 and plug 20 at the left-hand end of the cylinder, the latter fluid in readiness that when it is put under pressure, it is driven out (Fig. 3) through the line 6a to the wheel cylinder (not shown) in said line to operate the brake on that particular wheel.

Reference is had now, to the numeral 36, which designates a short pipe line, which is separate from but in close proximity to the cylinder and which constitutes a by-pass between the three-way valve 19 on the one hand and the coupling or fitting 22 on the other. As previously stated, this bypass is employed for bleeding the entire system whenever necessary or desired when the valve is in the correct position for doing so.

Reverting to the three-way valve 19 it is to be pointed out that this is a valve of conventional design and no claims, are, of course, directed thereto. Said valve is directly connected to and may be considered as a component part of the insertable and removable screw plug 17. In purpose it is employed to (A) open the line between the master cylinder and the fluid compartment in the cylinder 16 by way of passage or bore 18 in the plug 17. In addition, it may be utilized (B) to close this passage and to shunt or by-pass the fluid through by-pass pipe 26 and out through the T-coupling 22 and line 6a. Finally, it may be used (C) to close the line 8a between the master cylinder 8 and the safety device 9. Therefore, it may be visualized as a cut-off valve and also as a manually set regulating valve. In respect to the plug 20 this serves not only to accommodate the T-coupling 22 but provides the valve seat for the safety valve 24 and constitutes a foundation or base for the hook-equipped clips 27. The clips are removable, as a unit, with the screw plug 20. Both plugs 17 and 20 are screwed into the cylinder 16 flush with the opposite outer ends of the cylinder.

The purpose of the safety cylinder herein disclosed, is to eliminate danger created by breaking of any one or more brake lines on present hydraulic braking systems. It is well-known that if and when any line or wheel cylinder on present hydraulic braking systems develops a leak, it allows brake fluid to escape. This effects the braking on all wheels of the vehicle leaving the vehicle without benefit of brakes.

This safety cylinder is to be installed one to each brake line on a vehicle for the purpose of closing any brake line that may develop a leak, thus preventing the escape of brake fluid from the vehicle master cylinder and allowing the remaining wheels full provision of brakes just as they were before any defect showed up in defective line.

The size and/or length of the safety cylinder can be varied to fit any make or model vehicle which has hydraulic brakes. Variation, in fact, will be necessary to offset distance brake shoes separate or the distance brake fluid travels in the brake line, thus allowing room for action of piston within safety cylinder.

Under normal conditions, the piston inside the safety cylinder will advance toward the wheel cylinder when brakes are applied. When the brake pedal is released, back pressure created by contraction of the brake shoes will return the piston to normal position.

In case of a leak in any brake line beyond safety cylinder, the piston will advance when the brakes are applied until the valve on the piston seats in the valve seat, where it is locked by the spring locks, thus remaining in this closed position, automatically plugging the defective brake line, retaining brake fluid pressure for the remaining wheels.

Under normal circumstances, the piston means 26 works back and forth, without altering or interfering with the usual brake operational procedure. That is to say, when the brake pedal is applied, fluid under pressure is forced into the chamber existing between the head 31 and closing plug 17. The piston 26 under this incoming fluid pressure moves from right to left and forces fluid which is trapped in the chamber between the head 30 and the plug 20, through the line 6a into the wheel cylinder and the brake shoes are applied. When the pedal pusher is released, the fluid acts on parts to return the piston to the normal position seen in full lines in Figure 3. In case of a leak between the safety device, that is, the plug end 20 and the line 6a or wheel cylinder attached to said line, it is obvious that the outflow or leakage causes the piston 26, when the brake pedal is applied, to travel the full length of the cylinder 16, at which time the valve element 24 snaps into the retaining spring clips 28, thus seating the valve and cutting off the further passage of fluid through the cylinder and into the line 6a. In other words, an automatic cut-off of fluid is, at this time, attained. It follows that, since all fluid in the unbroken lines and in the line between the safety device and master cylinder is still retained, it is in readiness for future and further operation. This means that in case one wheel cylinder or line between the wheel cylinder and automatic safety cylinder goes bad, the remaining three lines are still good.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

Having described the invention what is claimed as new is:

1. A hydraulic brake line safety device comprising an open-ended cylinder internally screw threaded at its opposite end portions, a centrally bored externally screw threaded plug screwed into one screw threaded end of said cylinder, the outer end of said plug being flush with the corresponding end of said cylinder, the inner end of the bore in said plug having a conical valve seat and the inner surface of the plug being provided with spring clips, said clips having detent hooks lined up for coaction with said valve seat, a discharge line detachably connected to the outer end of said plug in alignment with said bore, a second externally screw threaded plug screwed into the remaining screw threaded end portion of said cylinder and provided with a central bore screw threaded at its outer end, a valve having a screw threaded member screwed into the screw threaded end of said central bore, and a piston mounted for reciprocation in the bore of said cylinder and shiftable back and forth in the space between said plugs, said piston being provided with an axial conical safety cut-out valve in alignment with and movable toward and from said valve seat, said valve being under certain conditions engaged by said hooks in order to positively and mechanically join the piston to the first-named plug until the latter is bodily removed from said cylinder and the hooks are detached from the valve, together with a bypass pipe independent of the cylinder and having one branch connected with the first-named valve and the other branch connected with said discharge pipe.

2. The structure specified in claim 1 wherein said piston comprises an elongated cylindrical body portion, enlarged disk-like heads at the opposite ends of said body portion, said heads joined to the ends of said body portion by way of reduced necks, and packing cups surrounding the respective necks and interposed between the body portion and the inner opposed surfaces of said enlarged disk-like heads.

ALFRED M. CARTER.

REFERENCES CITED

The following references are of record in the file of this patent:

UNITED STATES PATENTS

| Number | Name | Date |
| --- | --- | --- |
| 1,578,824 | Herbst et al. | Mar. 30, 1926 |
| 1,899,235 | Du Pont | Feb. 28, 1933 |
| 1,905,077 | Walker | Apr. 25, 1933 |
| 1,993,873 | Claspy et al. | Mar. 12, 1935 |
| 2,020,770 | Deiblieux et al. | Nov. 12, 1935 |
| 2,097,889 | Miller | Nov. 2, 1937 |
| 2,111,930 | Hinckley | Mar. 22, 1938 |
| 2,216,570 | Hollingshead | Oct. 1, 1940 |
| 2,332,301 | Cox | Oct. 19, 1943 |